(12) United States Patent
Stephens

(10) Patent No.: US 7,944,882 B2
(45) Date of Patent: May 17, 2011

(54) CHANNEL ACCESS APPARATUS, SYSTEMS, AND METHODS

(75) Inventor: Adrian P Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 2279 days.

(21) Appl. No.: 10/740,963

(22) Filed: Dec. 17, 2003

(65) Prior Publication Data

US 2005/0143081 A1    Jun. 30, 2005

(51) Int. Cl.
*H04W 4/00* (2009.01)
(52) U.S. Cl. ......... 370/330; 370/332; 370/436; 455/434
(58) Field of Classification Search .................. 455/451, 455/434; 370/330, 332, 436
See application file for complete search history.

(56) References Cited

U.S. PATENT DOCUMENTS

| | | | | |
|---|---|---|---|---|
| 5,428,819 A | * | 6/1995 | Wang et al. | 455/454 |
| 5,875,179 A | * | 2/1999 | Tikalsky | 370/315 |
| 7,164,671 B2 | * | 1/2007 | del Prado et al. | 370/338 |
| 7,280,517 B2 | * | 10/2007 | Benveniste | 370/338 |
| 2002/0136183 A1 | * | 9/2002 | Chen et al. | 370/338 |
| 2004/0224637 A1 | * | 11/2004 | Silva et al. | 455/63.4 |
| 2005/0078707 A1 | * | 4/2005 | Maltsev et al. | 370/471 |
| 2005/0135284 A1 | * | 6/2005 | Nanda et al. | 370/294 |

OTHER PUBLICATIONS

"Chinese Application Serial No. 200480036151.7, Office Action mailed Jun. 6, 2008", 18 pgs.
"International Search Report for corresponding PCT Application No. PCT/US2004/039476", (Mar. 23, 2005),3 pgs.
Meng, T. H., et al., "Wireless LAN revolution: from silicon to systems", 2001 *IEEE Radio Frequency Integrated Circuits (RFIC ) Symposium. Digest of Papers*, Phoenix, AZ, (May 20, 2001),p. 3-6.
Ming-Ju, H. , et al., "IEEE 802.11g OFDM WLAN Throughput Performance", *Vehicular Technology Conference, 2003*, vol. 4, VTC 2003-Fall,(Oct. 6, 2003),p. 2252-2256.
Mujtaba, S. A., "MIMO Signal Processing—The Next Frontier for Capacity Enhancement", *Proceedings of the IEEE 2003 Custom Integrated Circuits Conference (CICC* 2003) , (Sep. 21, 2003),p. 263-270.
Mujtaba, Syed Aon, IEEE Mimo Signal Processing, Wireless System Research Department (pp. 263-270).

* cited by examiner

*Primary Examiner* — Seema S Rao
*Assistant Examiner* — Sai-Ming Chan
(74) *Attorney, Agent, or Firm* — John F. Travis

(57) ABSTRACT

An apparatus and a system, as well as a method and article, may operate to reserve access to one or more overlapping channels having a resource allocation (e.g., a frequency range) overlapping a resource allocation of at least two overlapped channels by reserving access to the overlapped channels. Reservation of the overlapped channels may occur in a substantially simultaneous, serial, or semi-serial fashion.

12 Claims, 5 Drawing Sheets

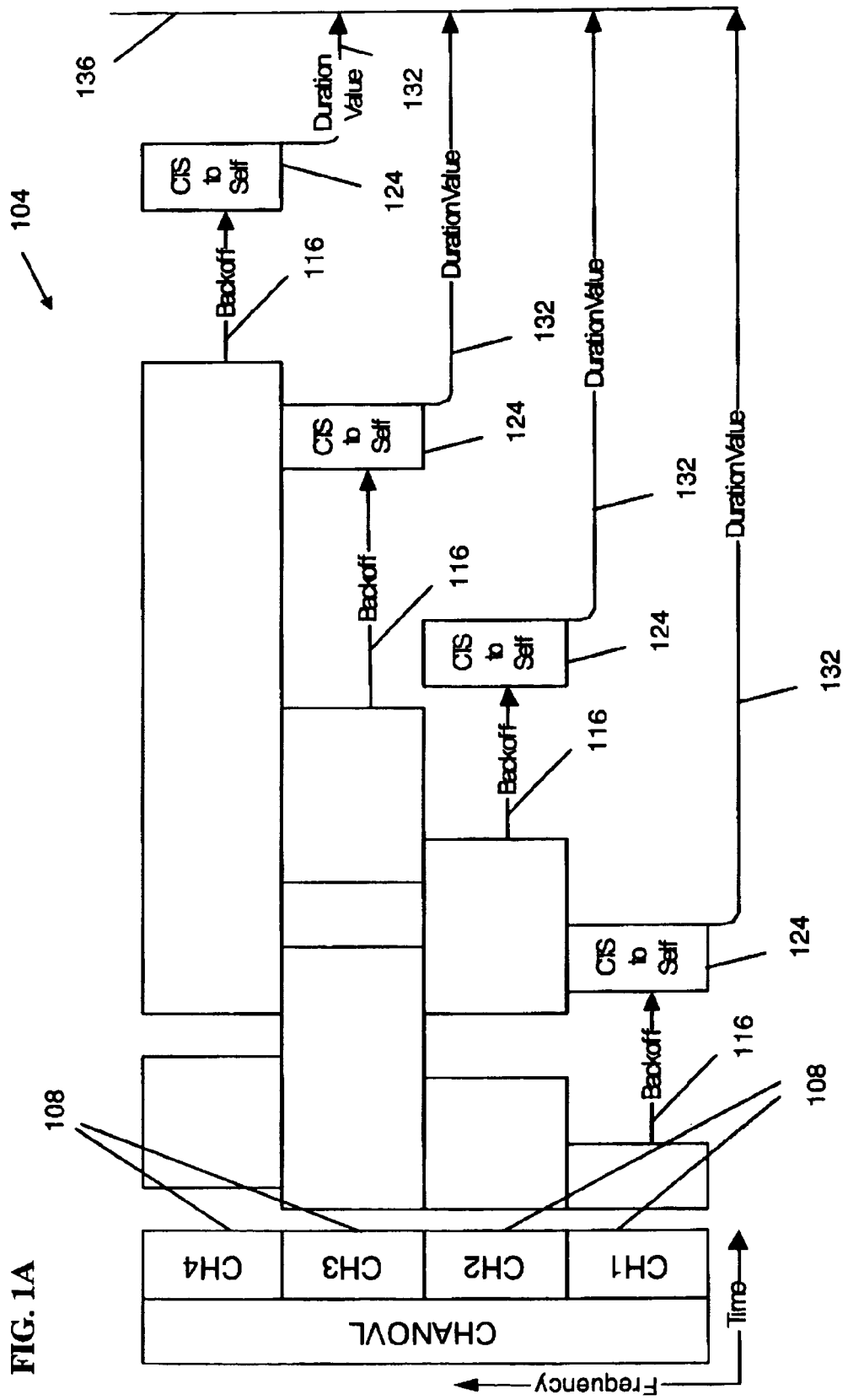

CHANNEL ACCESS APPARATUS, SYSTEMS, AND METHODS

TECHNICAL FIELD

Various embodiments described herein relate to communications generally, such as apparatus, systems, and methods used to transmit and receive information, including data packets.

BACKGROUND INFORMATION

Due to an increasing demand for greater throughput in multimedia communications, there is a desire to make use of potentially available wide bandwidth channels having an allocated resource (e.g., frequency coverage) that overlaps the coverage of two or more legacy communications channels. Since any one of the overlapped legacy channels may be in use at various times, the question arises: how to determine when the overlapping channel is available for communication? Waiting for all overlapped legacy channels to release resources (e.g., to become idle) at the same time may result in undesirable delay periods.

BRIEF DESCRIPTION OF THE DRAWINGS

FIGS. 1A and 1B are time sequence diagrams according to various embodiments;

DETAILED DESCRIPTION

During the process of communicating information, wireless devices may operate to simultaneously and/or incrementally reserve overlapped legacy channels so that communications may be conducted using overlapping channels. For example, to support communication using an overlapping channel, some embodiments of the invention may operate to sequentially perform a backoff operation and reserve non-busy overlapped channels. Once the desired overlapped channels have been reserved, the overlapping channel may be used for a selected time period, previously communicated to the overlapped channels. Reservation of the overlapped channels may occur in a substantially simultaneous, serial, or semi-serial fashion.

For the purposes of this document, the term "overlapping channel" includes a communication channel having a resource allocation that at least partially overlaps the resources allocated to two or more overlapped channels (e.g., the overlapping channel has an allocated frequency bandwidth that at least partially overlaps the frequency bandwidth allocated to two or more overlapped channels). For example, an overlapping channel may have a bandwidth of 40 MHz or 80 MHz that completely overlaps two or four 20 MHz channels, respectively. Thus, an "overlapped channel" refers to any channel having one or more allocated resources that are at least partially overlapped by the resources allocated to an overlapping channel (e.g., the overlapped channel may have an allocated frequency bandwidth that is at least partially overlapped by the frequency bandwidth allocated to an overlapping channel). Resources allocated to channels may include a frequency range, a bandwidth, one or more sub-channels, a time of transmission, a time of reception, a polarization, a range of directions, a range of positions, and a spreading code.

Figure 1B:
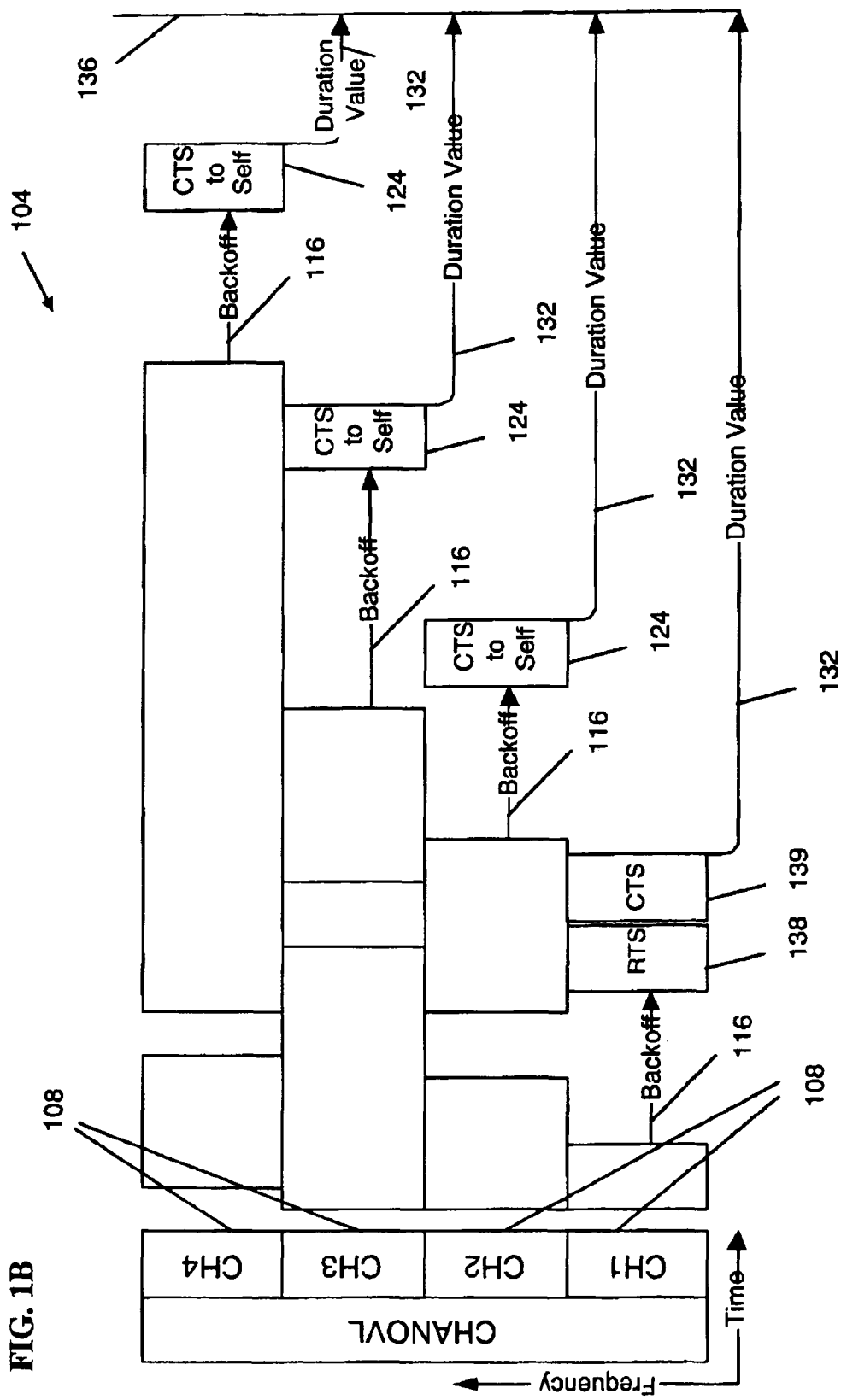

FIGS. 1A and 1B are time sequence diagrams 104 according to various embodiments. In these figures, specific embodiments are shown for simplicity, and should not be used to limit all of the embodiments disclosed herein. For example, the overlapped channels 108 are shown as being reserved in a substantially serial fashion, even though this type of reservation activity is but one of several options available.

Referring now to FIG. 1A, assume a communications device supports transmission and/or reception activities that make use of one or more channels (e.g., overlapping channels), such as CHANOVL, having one or more resources (e.g., a bandwidth or frequency allocation) that at least partially overlaps two or more communications channels (e.g., overlapped channels) 108, examples of which are those channels known to those of skill in the art as "legacy" channels. Reservation activities may begin by attempting to access one of the overlapped channels 108 via implementation of a carrier sense multiple access/collision avoidance (CSMA/CA) backoff procedure 116, similar to or identical to the backoff procedure defined by the Institute of Electrical and Electronics Engineers 802.11 standard, and related amendments.

When allocated resources include frequency or bandwidth, the overlapped channel CH1 to be accessed may be the lowest channel in frequency (e.g., as shown in FIG. 1A), the highest channel in frequency, or any channel in-between. When the backoff procedure 116 with respect to the overlapped channel CH1 is complete, the device may reserve channel CH1 by transmitting a clear to send (CTS) message (e.g., as defined by the IEEE 802.11 standard) 124 addressed to itself. For more information regarding the IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

The device may then go on to attempt access to and reservation of another of the overlapped channels (e.g., CH2, perhaps the next channel in frequency sequence, either up, as shown in FIG. 1A, or down) in the same manner, and repeat this series of activities, including the backoff procedure 116 and sending the CTS message 124, until all of the desired overlapped channels 108 have been reserved (e.g., CH1 . . . CH4). The device may then begin to communicate using the overlapping channel CHANOVL.

As shown in FIG. 1A the duration field 132 associated with each CTS message may contain a duration value that includes the remaining duration of the transmit opportunity (TXOP) gained by the first overlapped channel access. Each associated Basic Service Set (BSS) may then have the same network allocation vector (NAV) value, such that the associated systems receiving the CTS message 124 during the transmit opportunity time window 136 will not contend among themselves.

Many variations of the illustrated sequence are possible. For example, in some embodiments, except for the first channel where a transmit duration is defined (e.g., CH1), the device may transmit the CTS message a fixed period after the channel becomes quiet, rather than implementing a random backoff procedure. The fixed time period may include, for example, a point coordination function interframe space (PIFS) time period, as defined by an IEEE 802.11 standard. Other embodiments may be realized.

For example, as shown in FIG. 1B, if data is to be communicated via a unicast operation, the device may replace one or more of the CTS message transmissions 124 with a request to send (RTS) message 138 transmission to the recipient of the unicast data generating a CTS message 139 response from the addressed recipient. That is, one possible sequence of events that may be utilized when a unicast transmission of data is contemplated involves sending, instead of a CTS message 124 (as shown for CH1 in FIG. 1A), an RTS message 138 to the unicast receiver over one overlapped channel (e.g., CH1), and waiting for a CTS message 139 from the receiver in return (to confirm no collisions). Then CTS messages 124 addressed to the sender of the CTS messages may be sent over the other overlapped channels, as described previously, perhaps after waiting a fixed period of time (including a PIFS interval) or random period of time. The unicast transmission may then be made to the unicast recipient over the overlapping channel.

In some embodiments, the order in which the overlapped channels are reserved may be the same for all devices. For example, the overlapped channels may be reserved in order of frequency, or according to some other schedule that is set up prior to implementing the reservation process.

As a matter of contrast to the series of activities shown in FIGS. 1A and 1B, in some embodiments, the backoff time period for one overlapped channel (e.g., CH2) may begin at some time during the backoff procedure time period utilized with respect to another overlapped channel (e.g., CH1), such that the backoff time periods are not strictly sequential, nor are they strictly simultaneous; in such cases, the reservation activity is considered to occur in a "semi-serial" fashion. This method of operation may permit more rapid access to a multitude of overlapped channels. The disclosure of such modes of operation herein will lead those of skill in the art to realize that channel access attempts may also occur in a substantially simultaneous fashion, such that the device may transmit multiple (CTS) messages, each on a different overlapped channel, at the same time, or nearly the same time. Still other variations are possible.

For example, the device may skip attempting to access and reserve overlapped channels that have not been observed to operate in a legacy BSS. Further, an access point (AP) may transmit a list of overlapped channels occupied by a legacy BSS, such that a station communicating with the AP may use the list as a guide to skipping the access and reservation process with respect to unoccupied or unused channels. In some embodiments, the AP may designate a specific order in which overlapped channels are to be visited during incremental channel access and reservation.

Figure 2:
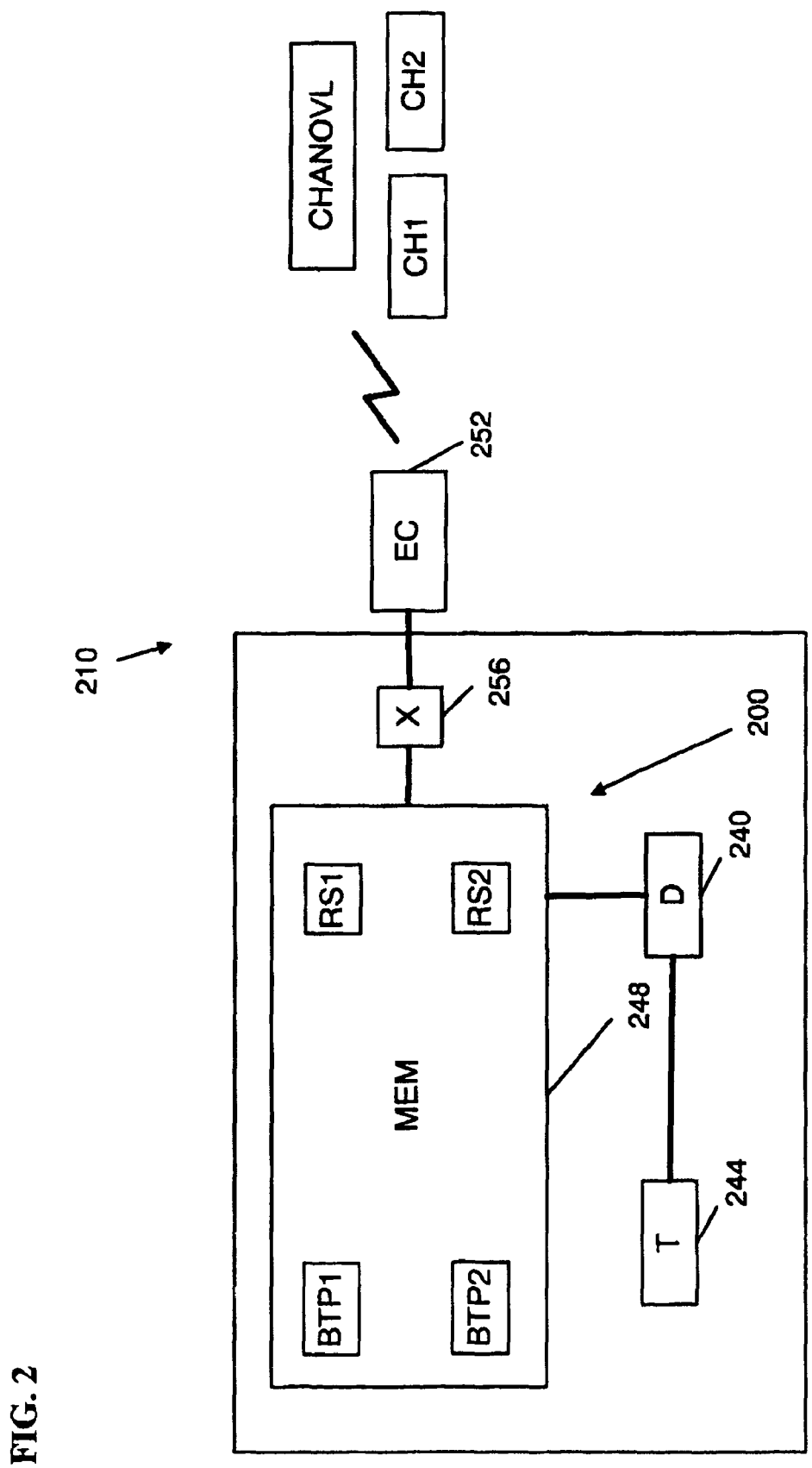
FIG. 2 is a block diagram of an apparatus and a system according to various embodiments.

FIG. 2 is a block diagram of an apparatus 200 and a system 210 according to various embodiments, each of which may operate in the manner described above. For example, an apparatus 200 may comprise a determination module 240 to determine whether access to a plurality of overlapped channels CH1, CH2 has been reserved for an overlapping channel CHANOVL having a resource (e.g., frequency) allocation overlapping a resource (e.g., frequency) allocation of the overlapped channels CH1, CH2. In some embodiments, the apparatus 200 may include a timer module 244 to couple to the determination module 240 and to measure a backoff time period (e.g., BTP1, BTP2) associated with the overlapped channels CH1, CH2. In some embodiments, the apparatus 200 may include a memory 248 to couple to the determination module 240 and to store one or more selected backoff time periods BTP1, BTP2 associated with the reservation of one or more of the overlapped channels CH1, CH2. A memory 248 may also be used to store the reservation status RS1, RS2 of one or more of the overlapped channels CH1, CH2. Other embodiments may be realized.

For example, a system 210 may include an apparatus 200, as well as an energy conduit 252 to couple to the overlapped channels CH1, CH2 and the overlapping channel CHANOVL. The energy conduit may be selected from one of an antenna (e.g., an omnidirectional, dipole, or patch antenna), infra-red transmitters and receivers, photo-emitters and receptors, and charge-coupled devices, among others. The system 210 may include a transceiver 256 to couple to the energy conduit 252, as well as a memory 248 to couple to the determination module 240 and to store one or more indications of reservation status RS1, RS2 for the overlapped channels.

The time sequence diagram 104, overlapped channels 108, CH1, CH2, CH3, CH4, overlapping channels CHANOVL, backoff procedure 116, CTS message 124, duration field 132, transmit opportunity time window 136, apparatus 200, system 210, determination module 240, timer module 244, memory 248, energy conduit 252, and transceiver 256 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 200 and the system 210, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of an apparatus 200 and system 210 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 3:
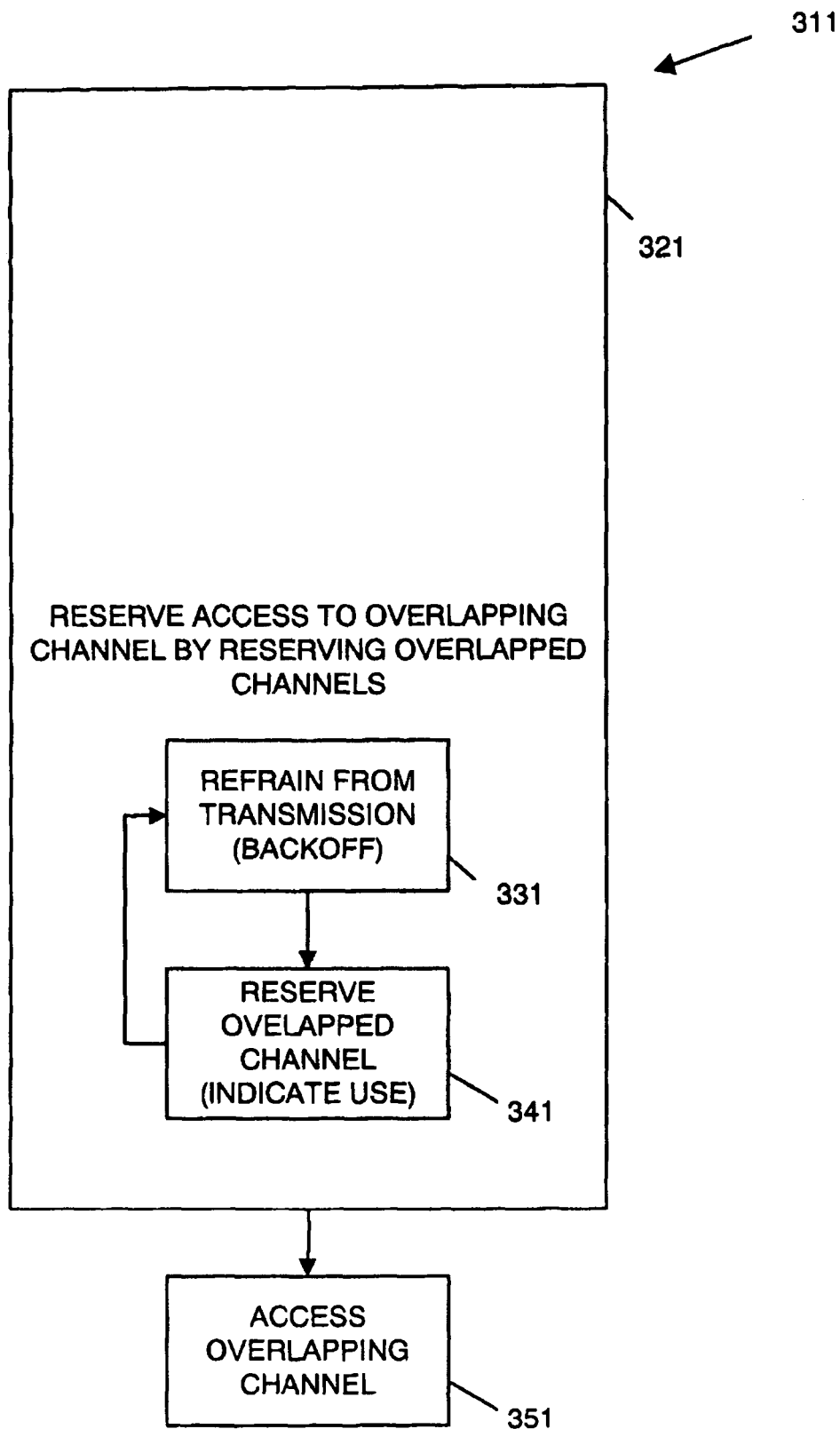
FIG. 3 is a flow chart illustrating several methods according to various embodiments.

FIG. 3 is a flow chart illustrating several methods according to various embodiments. Thus, in some embodiments of the invention, a method 311 may begin with reserving access to an overlapping channel having a resource (e.g., frequency range) allocation overlapping a resource (e.g., frequency range) allocation of at least two overlapped channels by reserving access to the at least two overlapped channels at block 321. Reserving access to the overlapping channel at block 321 may further include refraining from transmitting on at least one of the overlapped channels for a selected time period at block 331, and reserving one or more of the overlapped channels at block 341. After all of the desired overlapped channels have been reserved, the method 311 may include accessing (e.g., transmitting, receiving, or listening) using the overlapping channel at block 351. In some embodiments, the overlapped channels may be reserved according to a preselected order, such as in order of frequency, or according to some other schedule selected prior to implementing the reservation process.

Refraining from transmitting at block 331 may include, for example, performing a backoff procedure for one or more of the overlapped channels, perhaps as defined by an IEEE 802.11 standard. Reserving one or more of the overlapped channels at block 341 may include, for example, subsequently sending an indication of channel use for one or more of the overlapped channels.

In some embodiments, sending an indication of channel use may include sending a CTS message, as described previously, addressed to the sender itself (e.g., to the sender of the CTS message) over one or more of the overlapped channels. In some embodiments, particularly those involving unicast operations, sending an indication of channel use may include sending a RTS message, and waiting for a CTS message on an overlapped channel, and then sending self-addressed CTS messages on other overlapped channels as described previously. In some embodiments, performing the backoff procedure may occupy a time period selected from one of a random time period and a fixed time period. The fixed time period may include a PIFS time period.

The method 311 may include repeatedly performing a backoff procedure for selected ones of the overlapped channels, and repeatedly subsequently sending an indication of channel use (e.g., a CTS message) for selected ones of the overlapped channels. As described herein, any CTS message may include a transmit duration value adjusted according to some number of reserved channels selected from the overlapped channels (e.g., those overlapped channels already reserved).

There are many possibilities with respect to the timing of overlapped channel reservation. Reservation activities (e.g., performing a backoff procedure and sending an indication of channel use) may occur substantially simultaneously, serially, or semi-serially. Thus, reservation activities in effect for one overlapped channel occur during some part of the time similar activities are in effect for another overlapped channel.

Therefore, the method 311 may include substantially simultaneously sending an indication of channel use over two or more of the overlapped channels. In addition, reserving access to the overlapping channel may further include refraining from transmitting on one of the overlapped channels for a selected time period and, prior to an end of the selected time period, refraining from transmitting on another one of the overlapped channels for another selected time period.

It should be noted that the methods described herein do not have to be executed in the order described, or in any particular order. Moreover, various activities described with respect to the methods identified herein can be executed in serial or parallel fashion. Some activities may be repeated indefinitely, and others may occur only once. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 4.

Figure 4:
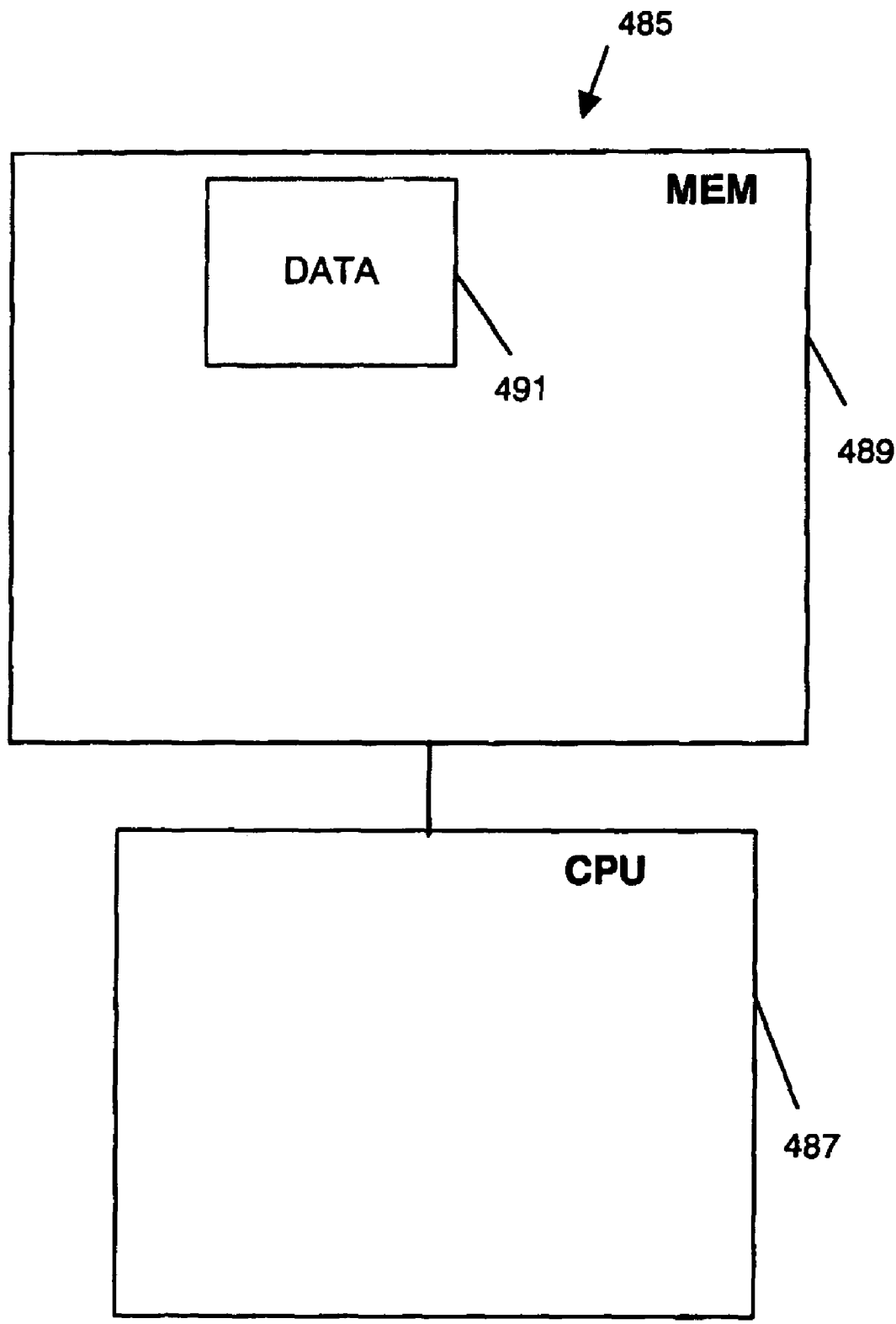
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as reserving access to an overlapping channel having a resource (e.g., frequency) allocation overlapping a resource (e.g., frequency) allocation of at least two overlapped channels by reserving access to the overlapped channels. As noted above, reserving access to the overlapping channel may further include refraining from transmitting on at least one of the overlapped channels for a selected time period, and reserving one or more of the overlapped channels.

Additional activities may include repeatedly performing a backoff procedure for selected ones of the overlapped channels, and repeatedly subsequently sending an indication of channel use for selected ones of the overlapped channels. Repeatedly subsequently sending an indication of channel use may further include sending a CTS message including a transmit duration value adjusted according to a number of reserved channels selected from the overlapped channels.

Implementing the apparatus, systems, and methods described herein may result in improved management of overlapping channels using legacy devices. Improved network throughput may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
reserving, by a communications device, access to an overlapping channel by reserving a first overlapped channel for a particular time period and subsequently reserving a second overlapped channel for a remainder of the particular time period, wherein the overlapping channel has an allocated frequency bandwidth that completely overlaps frequency bandwidths allocated to the first and second overlapped channels;
wherein the first and second overlapped channels do not overlap each other in frequency;
wherein said reserving the second overlapped channel comprises transmitting a clear to send (CTS) message containing a duration value including a remaining duration of the particular time period;
wherein the first overlapped channel and the second overlapped channel each have a bandwidth of 20 MHz, and the overlapping channel has a bandwidth that is a multiple of 20 MHz.

2. The method of claim 1, further including:
performing a backoff procedure before said transmitting the CTS.

3. The method of claim 2, wherein the backoff procedure is performed according to an Institute of Electrical and Electronics Engineers 802.11 standard.

4. The method of claim 2, wherein performing the backoff procedure occupies a time period selected from one of a random time period and a fixed time period.

5. The method of claim 4, wherein the fixed time period includes a point coordination function interframe space (PIFS) time period.

6. The method of claim 1, wherein said reserving the first and second overlapped channels further includes reserving access to the first and second overlapped channels in a preselected order.

7. The method of claim 6, wherein the preselected order comprises an order according to frequency.

8. An article including a non-transitory machine-accessible medium having associated information, wherein the information, when accessed, results in a machine performing:
reserving access to an overlapping channel by reserving a first overlapped channel for a particular time period and subsequently reserving a second overlapped channel for a remainder of the particular time period, wherein the overlapping channel has an allocated frequency bandwidth that completely overlaps frequency bandwidths allocated to the first and second overlapped channels;
wherein the first and second overlapped channels do not overlap each other in frequency;
wherein said reserving the second overlapped channel comprises transmitting a clear to send (CTS) message containing a duration value including a remaining duration of the particular time period.

9. The article of claim 8 wherein the machine-accessible medium further includes information, which when accessed by the machine, results in the machine performing a backoff procedure before transmitting the CTS.

10. An apparatus, comprising
a communications device having a memory and at least one antenna, the communications device to reserve access to an overlapping channel by reserving a first overlapped channel for a particular time period and subsequently by reserving a second overlapped channel for a remainder of the particular time period, wherein the overlapping channel has an allocated frequency bandwidth that completely overlaps frequency bandwidths allocated to the first and second overlapped channels;
wherein the first and second overlapped channels do not overlap each other in frequency;
wherein said reserving the second overlapped channel comprises transmitting a clear to send (CTS) message containing a duration value including a remaining duration of the particular time period.

11. The apparatus of claim 1, wherein the communications device is to perform a backoff procedure prior to transmitting the CTS message.

12. The apparatus of claim 2, wherein the backoff procedure occupies a time period selected from one of a random time period and a fixed time period.

* * * * *